W. B. PHINNEY.
MACHINE FOR CUTTING FISH, &c.
APPLICATION FILED NOV. 9, 1906. RENEWED APR. 4, 1910.

964,881.

Patented July 19, 1910.
6 SHEETS—SHEET 4.

Witnesses:—
Louis W. Gratz
Richard Sommer

Inventor
W. B. Phinney
by Geyer & Popp
Attorneys.

W. B. PHINNEY.
MACHINE FOR CUTTING FISH, &c.
APPLICATION FILED NOV. 9, 1906. RENEWED APR. 4, 1910.

964,881.

Patented July 19, 1910.
6 SHEETS—SHEET 5.

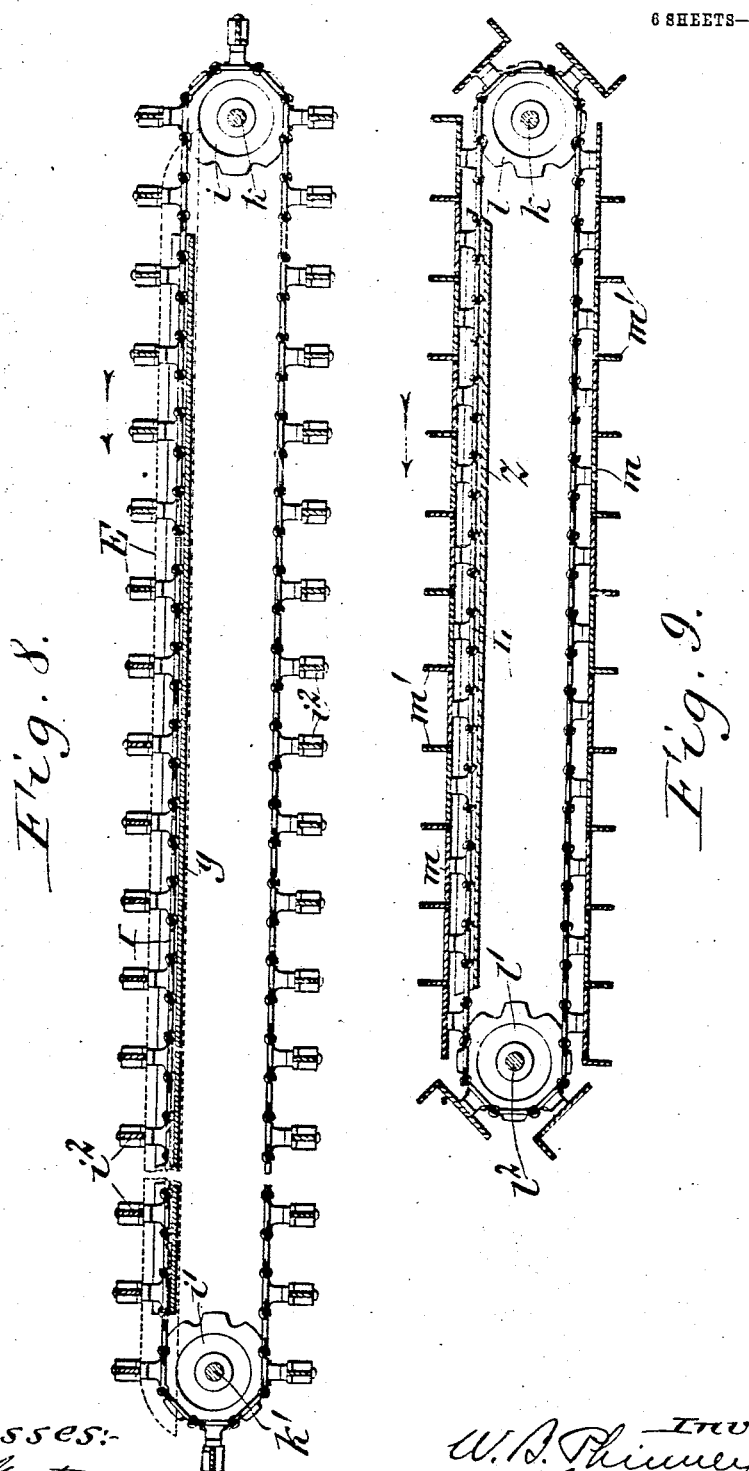

UNITED STATES PATENT OFFICE.

WILLIAM B. PHINNEY, OF WESTFIELD, NEW YORK, ASSIGNOR, BY MESNE ASSIGNMENTS, TO THE PHINNEY ENGINEERING COMPANY, OF CHILLICOTHE, OHIO, A CORPORATION OF OHIO.

MACHINE FOR CUTTING FISH, &c.

964,881. Specification of Letters Patent. Patented July 19, 1910.

Application filed November 9, 1906. Serial No. 342,684. Renewed April 4, 1910. Serial No. 553,291.

*To all whom it may concern:*

Be it known that I, WILLIAM B. PHINNEY, a citizen of the United States, residing at Westfield, in the county of Chautauqua and State of New York, have invented a new and useful Improvement in Machines for Cutting Fish, &c., of which the following is a specification.

This invention relates to a machine which is designed more particularly for cutting off the heads of fishes in canning factories although the same may also be used for cutting off the ends of other articles.

The object of this invention is to produce a machine whereby this cutting operation is effected expeditiously and thoroughly by means which are comparatively simple in construction and reliable in operation.

Figure 1:
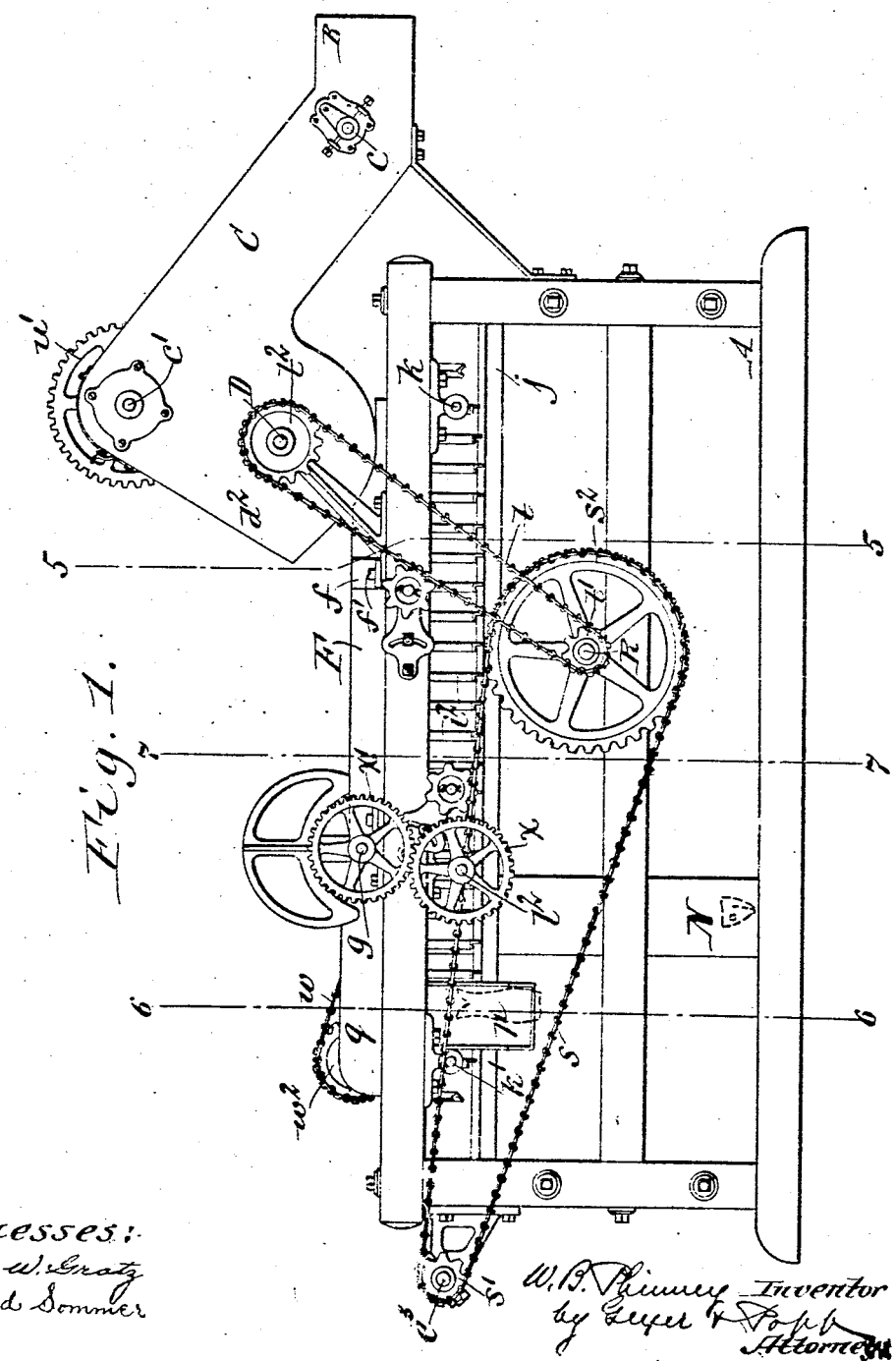
Figure 2:
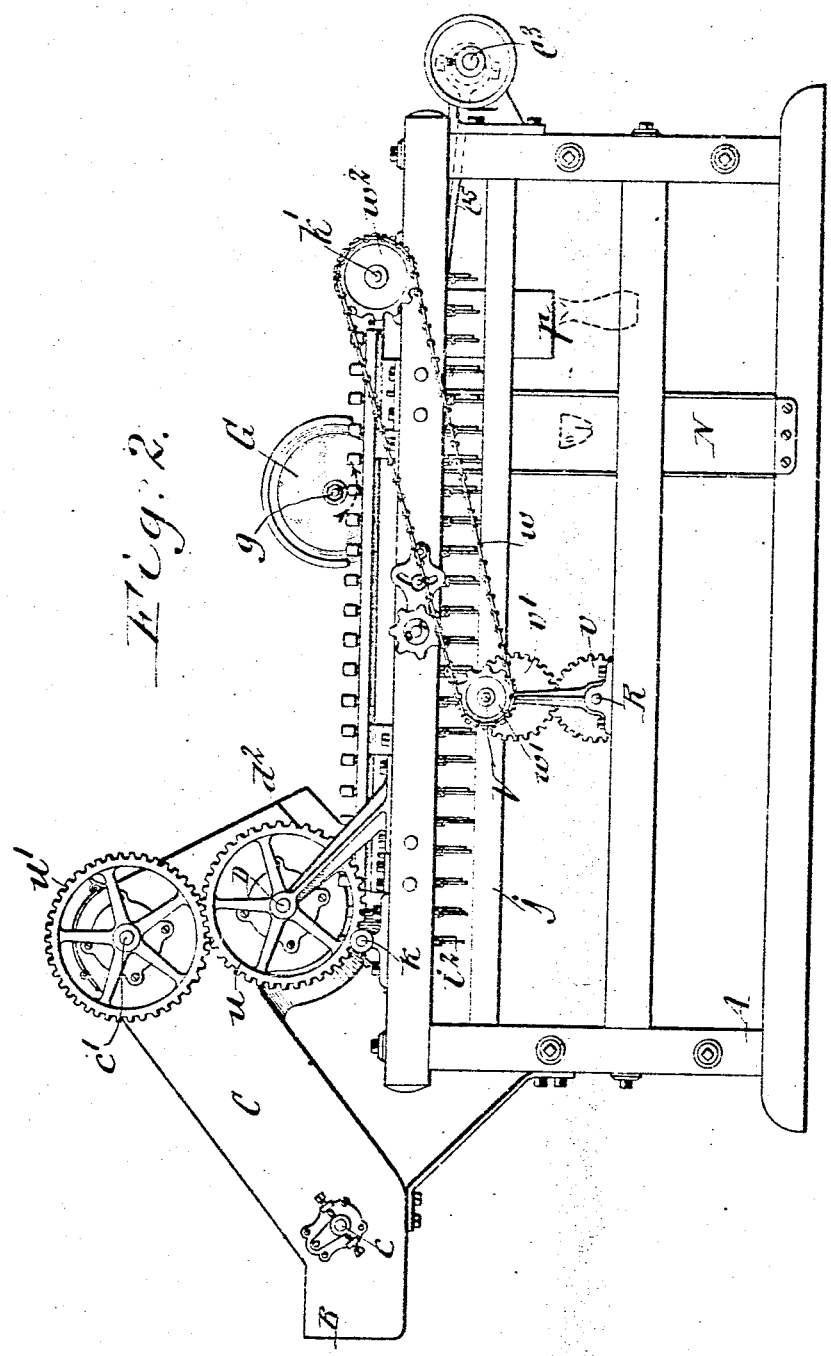
Figure 3:
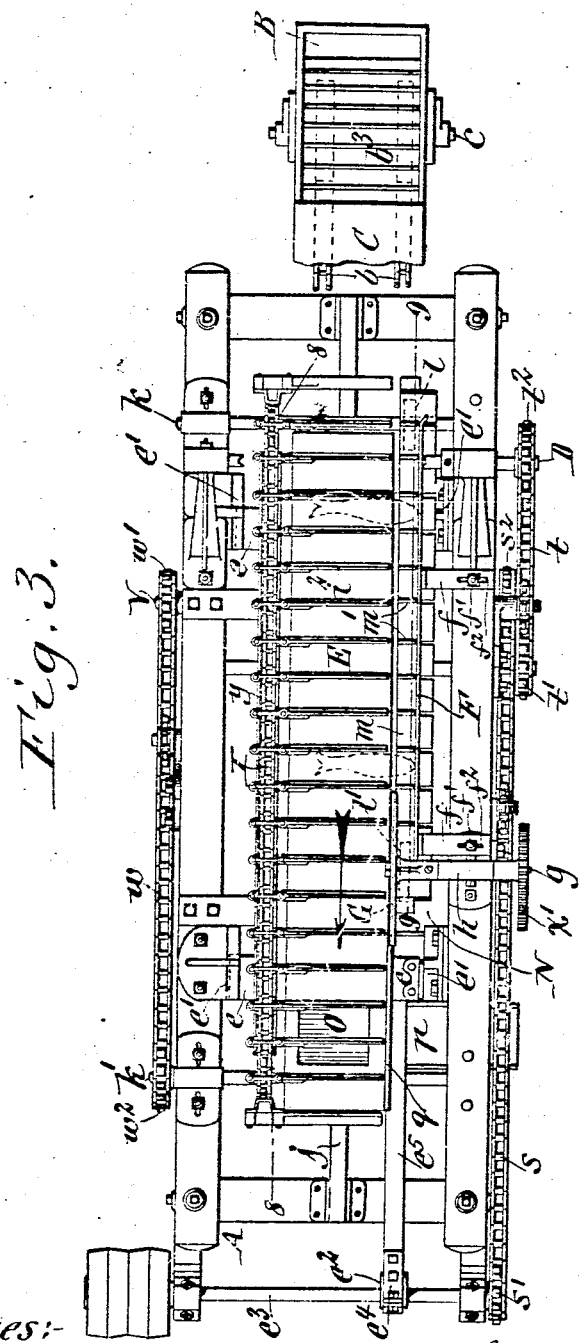
Figure 4:
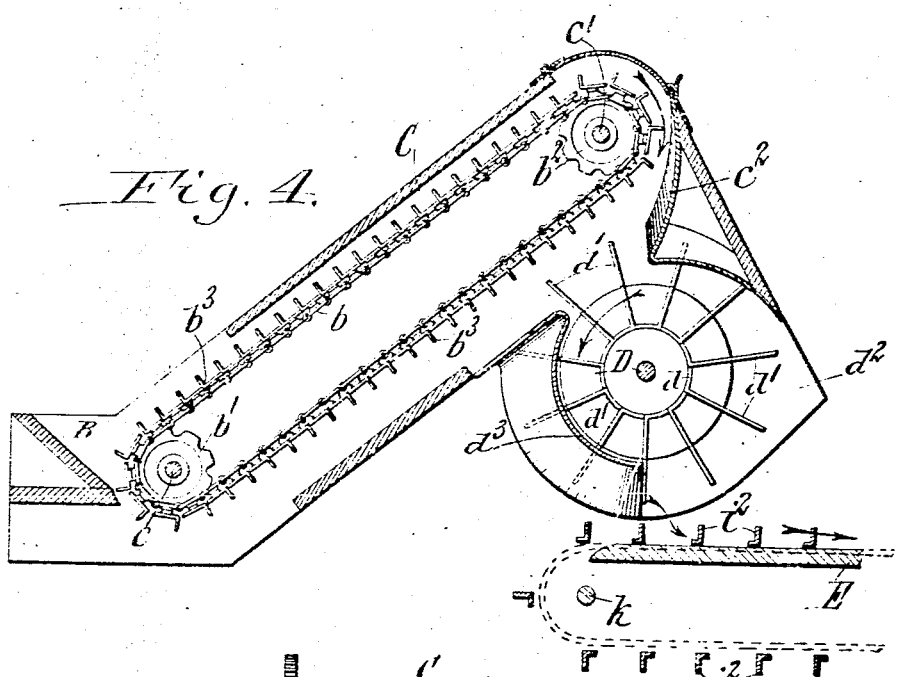
Figure 5:
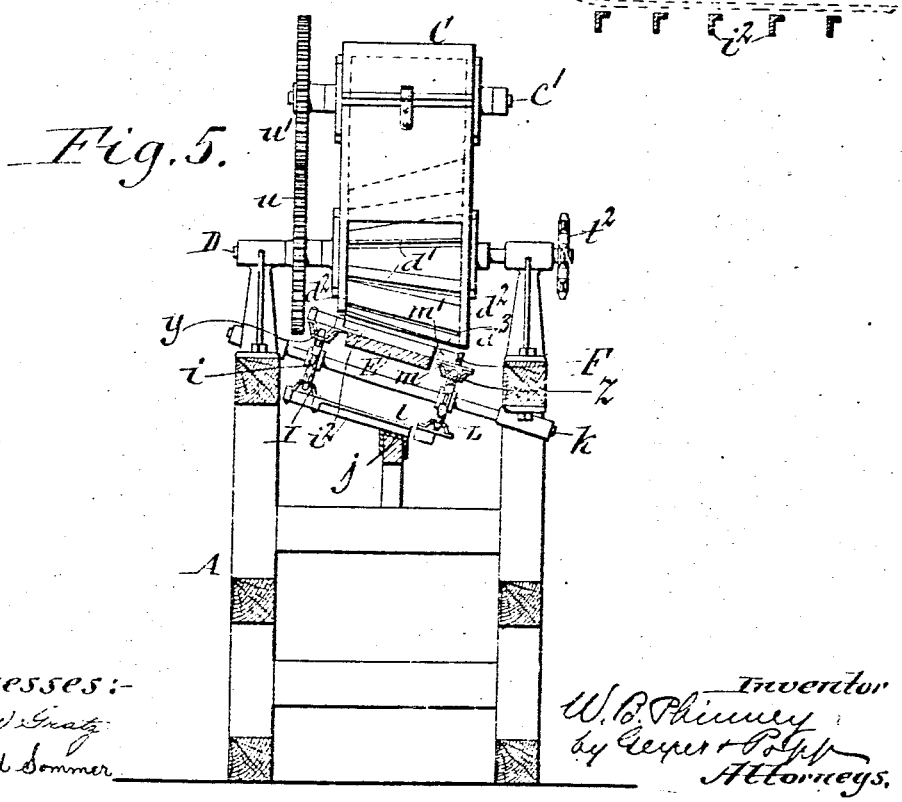
Figure 6:
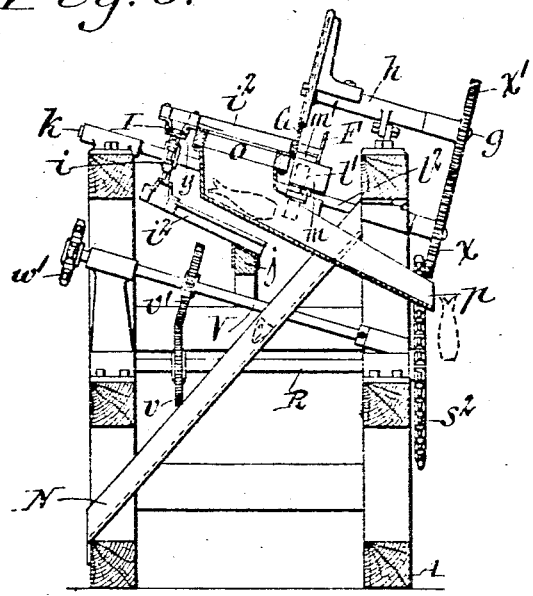
Figure 7:
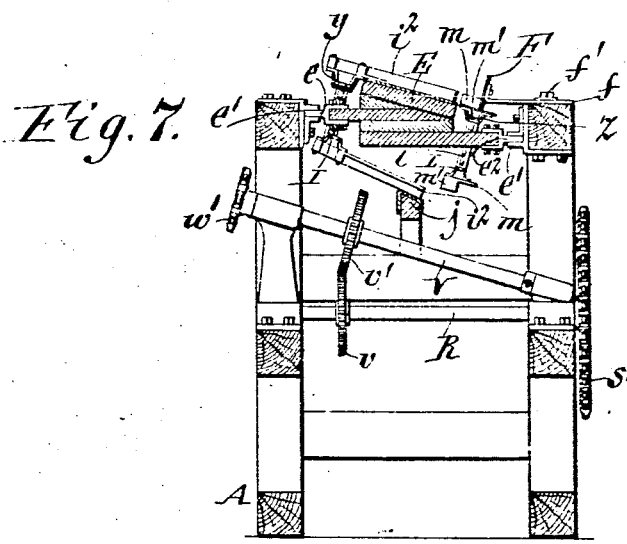

In the accompanying drawings consisting of 6 sheets: Figure 1 is a side elevation of the improved cutting machine. Fig. 2 is an elevation of the machine viewed from the side opposite to that shown in Fig. 1. Fig. 3 is a top plan view thereof with the feeding and straightening device partly removed. Fig. 4 is a vertical longitudinal section, on an enlarged scale, of the feeding and straightening device and the adjacent part of the conveyer, whereby the fishes or other articles are carried to the cutting mechanism. Figs. 5, 6 and 7 are vertical cross sections in the correspondingly numbered lines in Fig. 1. Figs. 8 and 9 are fragmentary longitudinal sectional elevations on an enlarged scale of the two sections of the fish conveyer, taken in lines 8—8 and 9—9, Fig. 3, respectively.

Similar letters of reference indicate corresponding parts throughout the several views.

The main frame A of the machine may be of any suitable construction to support the different working parts. At the upper front end of the frame is arranged the mechanism whereby the fishes from which the heads are to be cut or other articles which are to be trimmed off at the end are fed and properly alined preparatory to being carried to the cutter mechanism. This feeding and straightening mechanism is best shown in Figs. 4 and 5 and is constructed as follows:

B represents a feed hopper into which the fishes or other articles are deposited. From this hopper the fishes are moved forwardly and upwardly by means of an elevator which preferably consists of a pair of inclined endless main belts $b$ which have upper operative and lower inoperative portions and pass with their receiving ends around sprocket wheels $b^1$ arranged in the lower part of the feed hopper while their upper ends pass around a pair of elevated delivery sprocket wheels $b^2$. At intervals the belts $b$ are connected by transverse horizontal carriers, wings or buckets $b^3$ which move upwardly through an elevator leg C. The receiving and delivery sprocket wheels are mounted respectively upon horizontal shafts $c$, $c^1$ which are journaled in bearings in the side walls of the elevator leg.

As the fishes are deposited in the hopper the same are engaged by the carriers on the upper carrying portions of the belts and are carried thereby upwardly and rearwardly until they pass over the delivery sprocket wheels where they are discharged against a downwardly extending chute or guide $c^2$. The latter is arranged in front of the delivery wheels and directs the fishes or other articles to a device which operates to straighten the fishes and cause the same to be presented crosswise to the direction of movement to the devices which carry the same to the cutter. This straightening device consists of a vertically rotating feed wheel or reel arranged below the upper or elevated delivery end of the elevator and having a hub $d$ and a plurality of radial carriers, blades or wings $d^1$ forming pockets between the same which are closed at their inner ends but open at their outer ends. This straightening wheel or reel is mounted on a horizontal shaft D and its opposite ends are arranged close to two stationary vertical walls $d^2$ which form closures for the sides of the pockets of the reel. The latter is rotated in a direction opposite to that of the delivery sprocket wheels of the elevator and as its pockets arrive successively underneath the delivery end of the elevator, a fish is directed from a bucket of the latter by the upper chute or guide $c^2$ into the respective pocket of the wheel. While the pocket is on the upper side of the feed wheel the fish rests on the bottom of the pocket and lengthwise of the axis of the wheel. As this pocket during continued rotation of the wheel approaches the underside of the same the fish slides radially outward in the pocket and against a lower curved chute or guide $d^3$ which is arranged concentrically at the periphery of the straightening wheel. This lower chute or guide plate extends from a point at or about horizontally in line with the axis of the wheel to a point at or about vertically in line with said axis whereby this guide incloses about one quarter of the periphery of the wheel. As the fish slides outwardly in the pocket of the wheel upon reaching the guide $d^3$ the latter supports the fish and confines the same in the pocket thereof. During the continued rotation of the wheel, the same slides on the chute $d^3$ and is propelled by the next following wing $d^1$ in a transversely alined position relatively to the direction of movement until the fish reaches the front end of the lower chute when the same drops off from this end of the latter on the receiving end of a table E which is arranged comparatively close to the delivery end of the lower guide chute so that the fish during this drop does not materially shift its position.

The table E extends horizontally forward from the straightened wheel and lower chute and also inclines laterally whereby the fishes upon being deposited on this table tend to slide downwardly toward the depressed side thereof. In feeding the fishes the operator must place the same in the hopper B so that the same are lifted by the elevator and delivered by the straightening device upon the table with the heads of all the fishes arranged on the depressed side thereof.

The elevator is preferably constructed so as to carry the fishes in a horizontal position. In order, however, to properly transfer the fishes from the elevator to the table the outer edges of the wings of the straightening wheel or reel are inclined and together form a cone of the same angle as the inclined table, and the straightening chute $d^3$ is also constructed in the form of a conical segment corresponding to the angle of the conical wheel and the table, as shown in Figs. 4 and 5.

The fishes slide transversely on the table until their heads project laterally beyond the depressed side or edge of the same when they are arrested by means of a gage or bar F which is arranged lengthwise of the depressed side of the table at the receiving end thereof. This gage bar extends lengthwise from the receiving end of the table to the cutter G which severs the head from the body of the fish and is supported so as to be capable of transverse adjustment by means of two arms or brackets $f$ secured at their inner ends to the gage bar and at their outer ends to the main frame by means of bolts or screws $f^1$ passing through slots $f^2$ in said arms. By this means the cutter may be adapted to cut off more or less of the head ends of the fishes according to the size and kind of fishes which are being canned.

In order to cause the fishes to slide more readily toward the depressed side of the table, a vibratory movement is imparted to the same. This is preferably accomplished by means of slides, runners or supporting arms $e$ arranged on opposite sides of the table near the front and rear ends thereof and sliding in horizontal longitudinal guideways $e^1$ arranged on the adjacent parts of the main frame and a rotary eccentric $e^2$ mounted on a transverse driving shaft $e^3$ journaled on the front part of the frame and having its surrounding strap $e^4$ connected by a rod or bar $e^5$ with the table, as shown in Fig. 3. By this means a rapid longitudinal reciprocating movement is imparted to the table which prevents the fishes from lodging on the elevated part of the table and causes them to slide positively transversely toward the depressed end thereof until the heads of the fishes engage with the gage bar.

The cutter which severs the heads from the bodies of the fishes preferably consists of a circular disk having its periphery sharpened. This disk is arranged adjacent to the front end of the gage bar and projects with its lower part downwardly past the adjacent depressed part of the table so that the latter acts as a shearing member which coöperates with the cutting disk for severing the heads from the fishes as the same are moved in a crosswise position over the table and under the cutter. The latter is mounted on the inner end of a shaft $g$ which is journaled in a bearing $h$ on the adjacent part of the main frame and is rotated so that its lower part moves in the same direction in which the fishes move over the table.

As the fishes are deposited crosswise upon the table and slide downwardly toward the depressed side thereof with their heads in engagement with the gage the same are moved forward to and past the cutter by means of a conveyer or propelling device. This conveyer is constructed in two sections which are arranged on opposite sides of the cutter and one of which engages with the bodies of the fishes and the other with the heads of the same. The conveyer for the bodies of the fishes preferably comprises an endless chain belt I arranged with its upper operative and its lower inoperative portions adjacent to the elevated side of the table and passing at its receiving and delivery ends around sprocket wheels $i$, $i^1$ arranged to the receiving and delivery ends of the table. At intervals this chain belt is provided with carriers, blades or wings $i^2$ which project laterally from the same over the table and toward that side thereof on which the cutter is arranged, as shown in Fig. 3. These wings or carriers in moving forwardly with the upper operative part of the chain belt I sweep lengthwise and forwardly over the top of the table and carry the fishes which are deposited upon the same between the wings in the same direction. The lower inoperative wings of the body propelling belt move backward idly underneath the table at which time the wings are supported at their free ends by means of a longitudinal supporting rail $j$, as shown in Figs. 1, 5, 6, and 7. In order to permit the wings of the body belt to assume the same angle as the table and engage fully therewith, the receiving and delivering sprocket wheels of this belt are mounted on suitably inclined, transverse shafts $k$, $k^1$ which are journaled in bearings on the adjacent part of the main frame, as shown in Fig. 5.

The conveyer section for the heads of the fishes comprises an endless chain belt L having a horizontal upper or operative portion which is arranged lengthwise adjacent to the depressed side or edge of the table and a lower inoperative portion and passing with its receiving end around a sprocket wheel $l$ on the shaft $k$ while its delivery end passes around a sprocket wheel $l^1$ which is arranged adjacent to the lower part of the cutter and is mounted on a transverse shaft $l^2$ journaled in a bearing on the adjacent part of the main frame and inclined at the same angle as the table. This head conveying belt is provided with a plurality of carriers, buckets or wings each of which has a substantially horizontal bottom $m$ and a vertical back wall $m^1$ projecting upwardly from the rear edge of the bottom adjacent to the depressed side of the table. In moving forwardly with the operative part of the head conveying belt the bottom of each head carrier is arranged flush with the top of the table and at the same angle so as to form practically a continuation thereof, and the back of each head carrier is arranged transversely in line with the adjacent carrier or wings of the body carrier, whereby the operative carriers of the head conveyer together with the adjacent operative carriers of the body conveyer form pockets or buckets which receive the fishes and together carry the same forward to the cutter.

The outer longitudinal edge portion of each bottom part of the head carrier while moving forward with the upper operative part of its belt extends outwardly underneath the gage and forms a joint with the same which prevents the heads of the fishes from passing between the bottoms of the head carriers and the lower edge of the gage.

After the heads and bodies of the fishes have been severed by being moved past the cutter, the delivery end of the heads conveyer which terminates immediately in rear of the cutter discharges the heads downwardly into an inclined chute N which leads downwardly and laterally to one side of the machine.

The bodies are carried by the body conveyer forwardly over the table beyond the cutter until they reach an opening $o$ in the table through which the bodies drop successively into an inclined chute $p$ which leads downwardly and laterally to the opposite side of the machine and is arranged in rear of the head delivery chute. In order to prevent the bodies of the fishes from sliding laterally off the depressed side of the table after passing the cutter, a guard rail $q$ is provided which projects upwardly from the depressed side of the table and extends from the cutter forwardly to the delivery end of the table.

Various means may be employed for driving the different parts of the machine. As shown in the drawings, the power is transmitted from the main driving shaft $e^3$ to a horizontal counter shaft R journaled transversely in the lower central part of the frame by means of a chain belt $s$ and sprocket wheels $s^1$, $s^2$ as shown in Fig. 1, and from the counter shaft the motion is transmitted to the shaft D of the feed wheel by a sprocket chain $t$ and wheels $t^1$, $t^2$, as shown in the same figure. The elevator and straightening wheel are caused to operate in unison by means of intermeshing gear wheels $u$, $u^1$ secured respectively to the feed wheel shaft and the delivery shaft $c^1$ of the elevator, as shown in Figs. 2 and 5. Arranged above the counter shaft is an inclined intermediate shaft V which is operatively connected with the countershaft by a pair of bevel gear wheels $v$, $v^1$, as shown in Figs. 6 and 7, and from one end of this intermediate shaft motion is transmitted by a chain $w$ and sprocket wheels $w^1$, $w^2$ to the shaft $k^1$ which carries the delivery sprocket wheel of the body conveyer. Inasmuch as the receiving sprocket wheel of the head conveyer is secured to the same shaft as the receiving sprocket wheel of the body conveyer, these two conveyers are compelled to move in unison. At the outer end of the shaft which carries the delivery sprocket wheel of the head conveyer is mounted a gear wheel $x$ which meshes with a similar wheel $x^1$ at the outer end of the cutter shaft, as shown in Figs. 1 and 6, whereby the cutter is driven.

In order to prevent the operative portions of the belts of the head and body conveyers from sagging and possibly interfering with the proper propulsion of the fishes toward the cutter, these portions of the conveyer belts are supported in channel-shaped guides $y$, $z$ arranged lengthwise of the machine.

The carriers of the elevator, the feed or straightening wheel of the head and body conveyers are so spaced that only one or a few fishes or other articles at a time can enter the space between two adjacent carriers, thereby preventing the articles from assuming other than a crosswise position and insuring the proper presentation of the same to the cutter.

Although in the foregoing description reference has been made principally to the cutting off of the heads of fishes it is to be understood that this invention is not limited to such use as the machine is equally serviceable for cutting off the ends of other articles.

I claim as my invention:

1. In a machine of the character described, the combination of an inclined table, a cutter arranged at the depressed side of the table, a conveyer for carrying articles over and in contact with said table and past said cutter, and means for vibrating said table, substantially as set forth.

2. In a machine of the character described, the combination of a transversely inclined table, a stationary gage arranged at the depressed side of the table and limiting the extent which the article on the table projects beyond this side of the same, a cutter arranged adjacent to the depressed side of the table in front of said gage, a conveyer whereby the articles are moved over said table to said cutter, and means for vibrating said table lengthwise consisting of slides arranged on the table, longitudinal guideways which receive said slides, and a rotary eccentric having its surrounding strap connected with said table, substantially as set forth.

3. In a machine of the character described, the combination of a transversely inclined feed table, a gage arranged at the depressed side of the table and operating to limit the extent which the ends of the articles on the table may project beyond its depressed side, a cutter arranged at the depressed side of the table in front of the gage, a guard arranged along the depressed side of the table in rear of the cutter and in line with the latter, and a conveyer for moving the articles to be cut over said table and past said cutter, substantially as set forth.

4. In a machine of the character described, the combination of a transversely inclined table having a discharge at its rear or delivery end, a gage arranged adjacent to the receiving end of said table and at the depressed side thereof and operating to limit the extent which the articles on the table may project beyond the depressed side thereof, a cutter arranged at the depressed side of the table in front of the gage, a guard arranged at the depressed side of the table and extending from the rear edge of the cutter to said discharge, and a conveyer which operates to move said articles over said table, past said cutter and to said discharge, substantially as set forth.

5. In a machine of the character described, the combination of a transversely inclined table having a discharge at its rear or delivery end, a gage arranged adjacent to the receiving end of said table and at the depressed side thereof and operating to limit the extent which the articles on the table may project beyond the depressed side thereof, a cutter arranged at the depressed side of the table in front of the gage, a guard arranged at the depressed side of the table and extending from the rear edge of the cutter to said discharge and a conveyer which operates to move said articles over said table and past said cutter and which consists of a belt arranged lengthwise adjacent to the elevated side of the table, and transverse wings movable over the table and connected at one end with the belt and unconnected at the opposite end, substantially as set forth.

6. In a machine of the character described, the combination of a transversely inclined table adapted to support the article to be cut, a gage arranged adjacent to the depressed side of the table and operating to limit the distance which said article may project beyond the respective side of the table, a cutter arranged between said gage and the depressed side of the table, and a conveyer for moving said article over said table and past the cutter and composed of two sections arranged on opposite sides of the cutter, one of said sections consisting of a belt arranged between the cutter and gage and moving with its operative portion from the receiving end of the table to the cutter and having a plurality of carriers each of which consists of a bottom extending laterally from the side of the table underneath the gage, and a side wall projecting upwardly from the rear edge of the bottom adjacent to one side of the table and the other section consisting of a belt arranged adjacent to the elevated side of the table and having carriers which project laterally therefrom over the table, substantially as set forth.

7. In a machine of the character described, the combination of a transversely inclined table adapted to support the article to be cut, a gage arranged adjacent to the depressed side of the table at its receiving end and operating to limit the distance which said article may project beyond the respective side of the table, a cutter arranged in front of the gage and adjacent to the depressed side of the table, a guard arranged adjacent to the depressed side of the table in line with the cutter and extending from the cutter to the delivery end of the table, and a conveyer for moving said article over said table and past the cutter and composed of two sections arranged on opposite sides of the cutter, substantially as set forth.

8. In a machine of the character described, the combination of a transversely inclined table adapted to support the article to be cut, a gage arranged adjacent to the depressed side of the table at its receiving end and operating to limit the distance which said article may project beyond the respective side of the table, a cutter arranged in front of the gage and adjacent to the depressed side of the table, a guard arranged adjacent to the depressed side of the table and extending from the cutter to the delivery end of the table, a conveyer for moving said article over said table and past the cutter and composed of two sections arranged on opposite sides of the cutter, and means for vibrating said table, substantially as set forth.

9. In a machine of the character described, the combination of a transversely inclined table adapted to support the article to be cut, a gage arranged at the depressed side of the table and operating to limit the distance which said article may project beyond the respective side of the table, a cutter arranged in front of said gage and on the same side of the table, a conveyer for moving said article over said table and past the cutter and means for delivering said articles to said table and conveyer and comprising a conical reel turning on a horizontal axis and having the outer edges of its blades arranged at the same angle as the table and moving on the underside of the reel close to the receiving portion of said conveyer, an elevator which delivers the articles to be cut into the pockets between said blades at the top of the reel and a curved guide arranged concentrically around the lower rear part of the periphery of the reel and operating to confine said articles in said pockets until they reach the lower part of the reel, substantially as set forth.

Witness my hand this 25th day of October, 1906.

WILLIAM B. PHINNEY.

Witnesses:
F. A. ROGERS,
THEO L. POPP.